United States Patent [19]

Frisch

[11] 4,131,131
[45] Dec. 26, 1978

[54] VALVE CONSTRUCTION
[75] Inventor: Paul P. Frisch, Skokie, Ill.
[73] Assignee: Dayco Corporation, Dayton, Ohio
[21] Appl. No.: 809,133
[22] Filed: Jun. 22, 1977
[51] Int. Cl.² ............................................. F16K 37/00
[52] U.S. Cl. ................................... 137/559; 251/175; 251/203
[58] Field of Search ................ 137/559, 242; 251/158, 251/175, 203, 204, 144, 147, 187, 334, 326, 193; 61/28

[56] References Cited
U.S. PATENT DOCUMENTS

| | | | |
|---|---|---|---|
| 1,965,826 | 7/1934 | Daniel | 251/193 X |
| 2,128,542 | 8/1938 | Snow | 251/158 |
| 2,925,825 | 2/1960 | Staiger | 251/334 X |
| 2,947,511 | 8/1960 | McInnes | 251/203 |
| 3,258,244 | 6/1966 | Hilton | 251/326 X |
| 3,495,805 | 2/1970 | Steckle | 251/203 X |
| 3,521,659 | 7/1970 | Seger | 251/334 X |
| 3,527,440 | 9/1970 | Presslauer | 251/158 X |
| 3,752,181 | 8/1973 | Morris | 251/308 X |

Primary Examiner—Harold W. Weakley
Attorney, Agent, or Firm—Reuben Wolk

[57] ABSTRACT

A gate valve construction is provided and comprises, a valve body having an inlet and a discharge orifice, a flexible gate for the discharge orifice, and a mechanism for supporting and moving the gate in front of and away from the orifice with the gate being adapted to be sealed against the orifice by upstream pressure defining a dished configuration in the gate which is concave toward the inlet.

16 Claims, 9 Drawing Figures

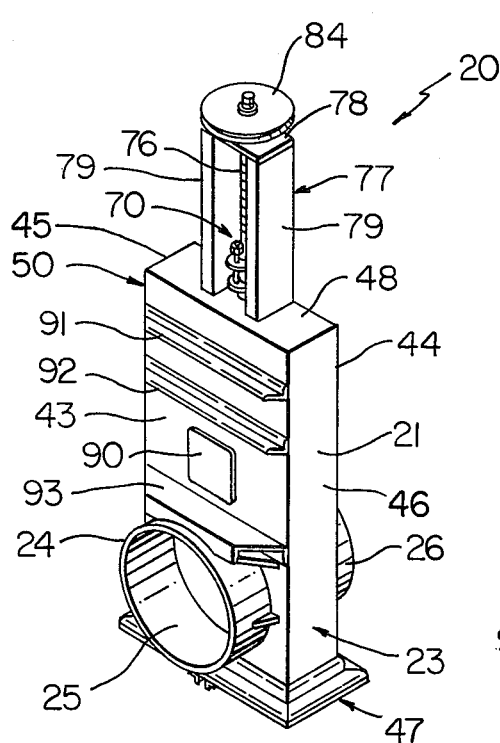
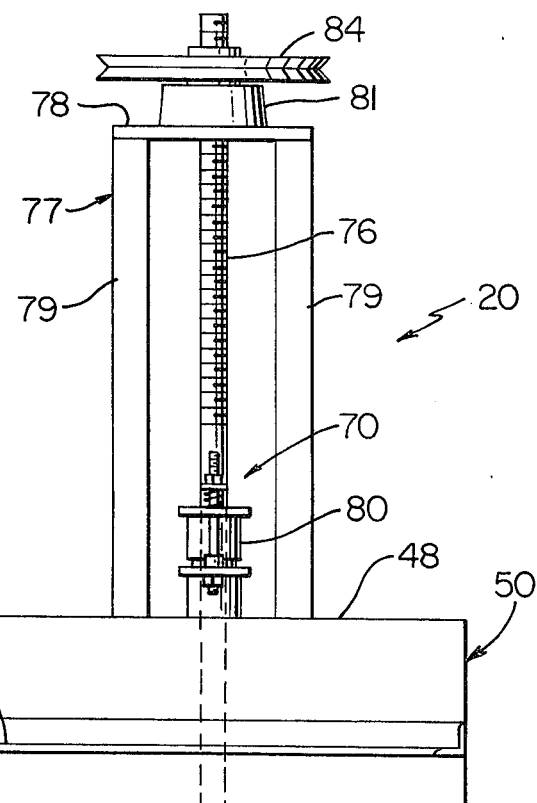
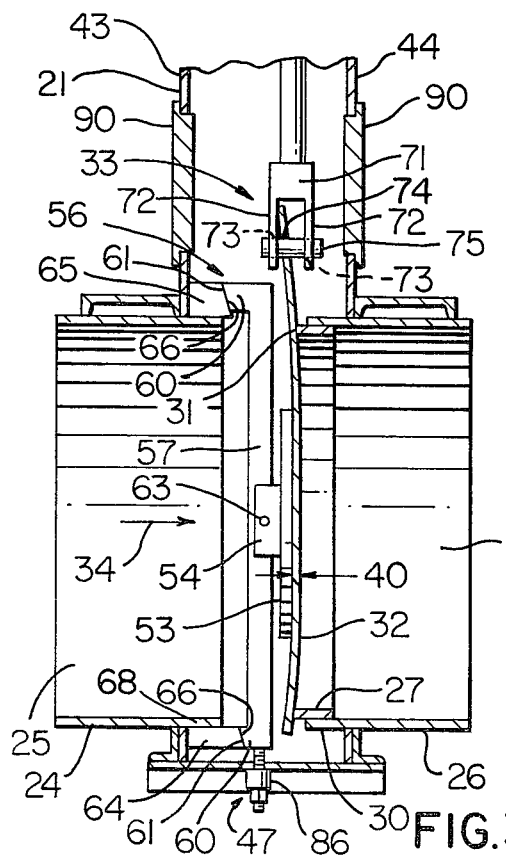
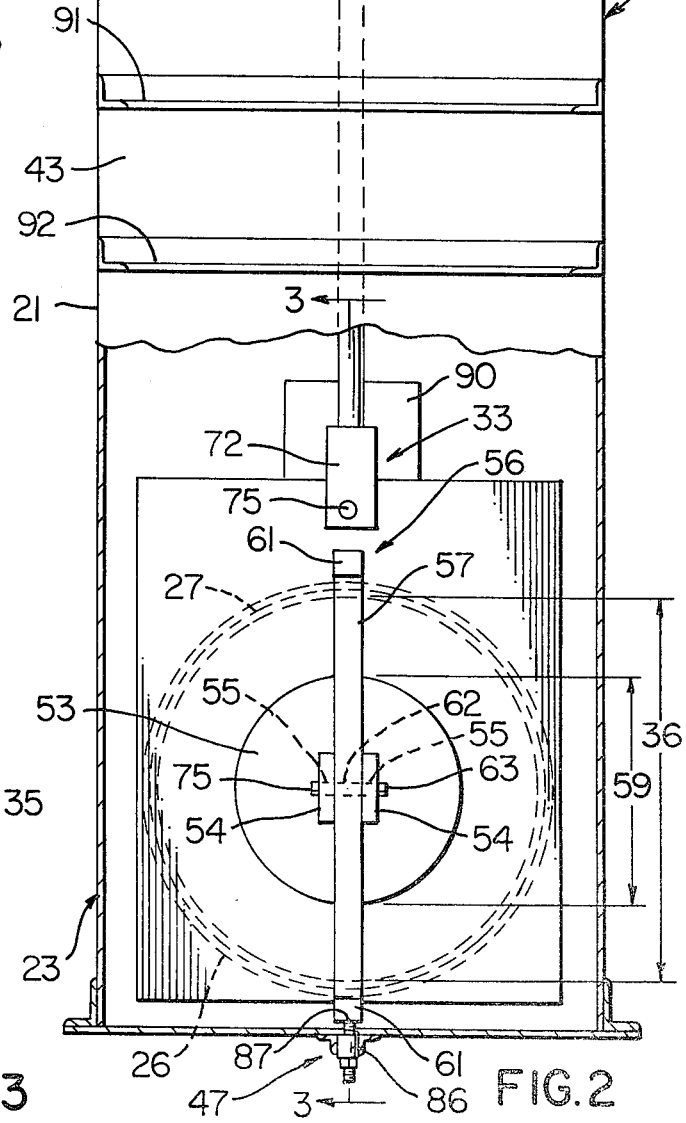
FIG.1
FIG.3
FIG.2

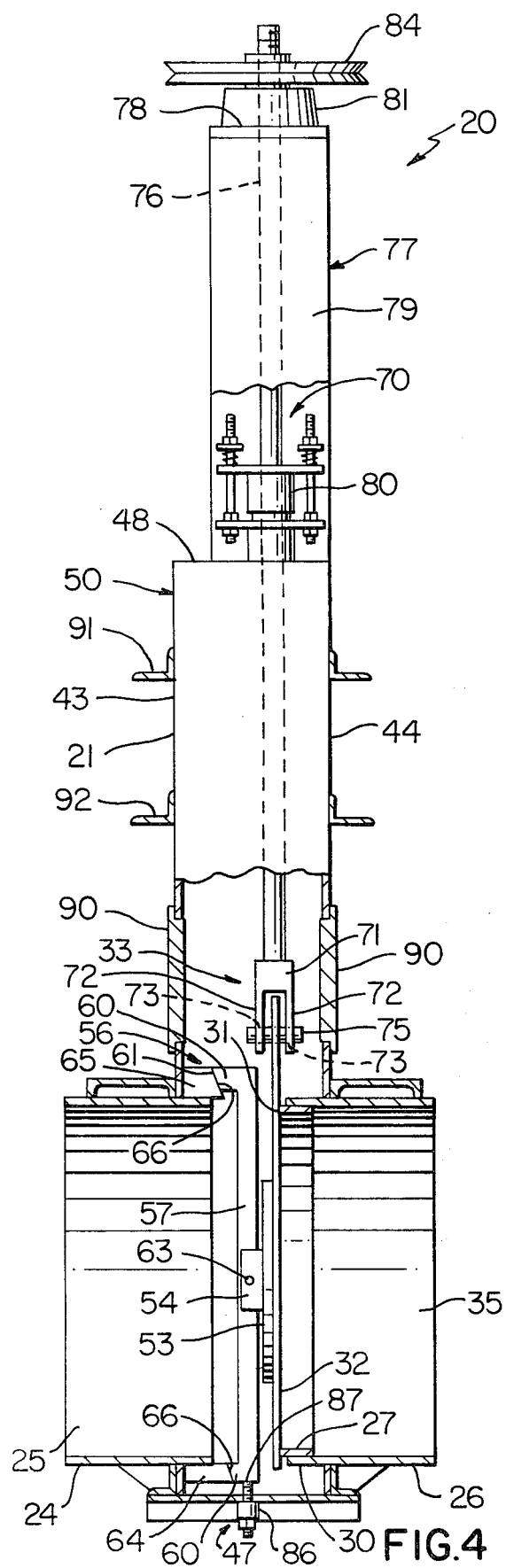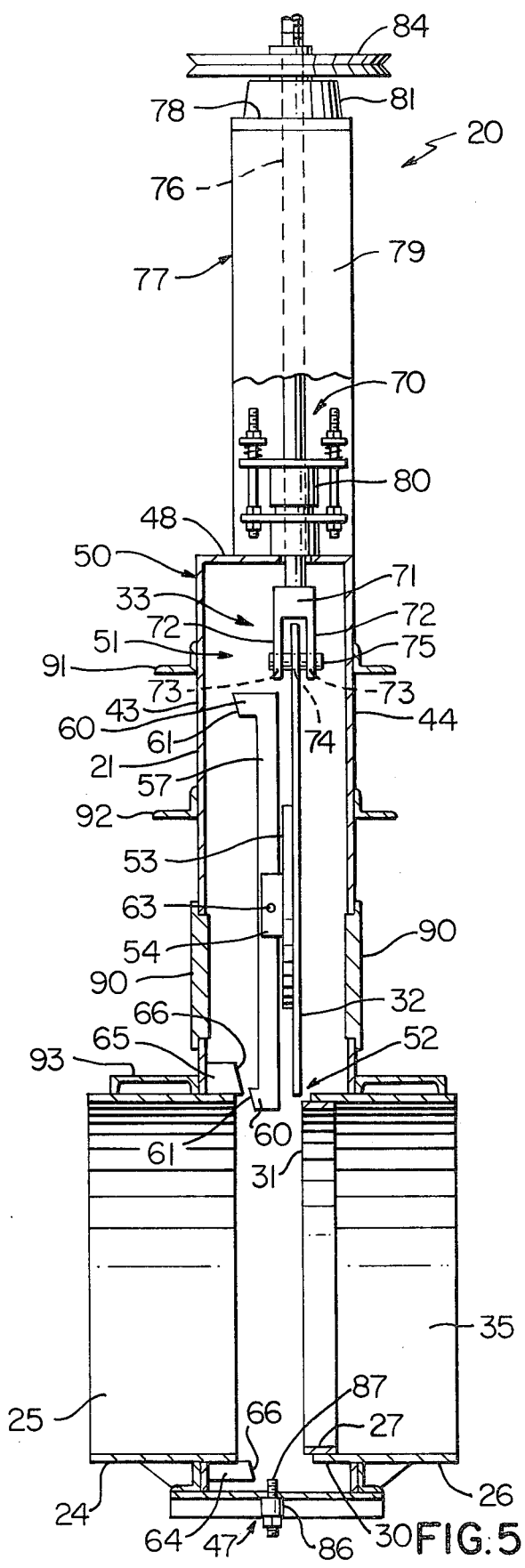

VALVE CONSTRUCTION

BACKGROUND OF THE INVENTION

Comparatively large gate valve constructions, each generally of the order of several feet in effective flow diameter, are widely used in various applications in industry. Particularly in comparatively low pressure gas conduits of the order of less than 30 psig it is difficult to provide a simple and economical valve construction which seals against gas flow therethrough once closed yet is capable of reliable operation over a substantial number of operating cycles.

SUMMARY

It is a feature of this invention to provide a gate valve construction having an effective flow diameter generally of the order of several feet which is of simple and economical construction.

Another feature of this invention is to provide a valve of the character mentioned which is capable of reliable operation over a substantial number of operating cycles.

Another feature of this invention is to provide a valve of the character mentioned which employs a sheetlike, resilient, flexible gate which utilizes the physical properties of such gate acting against an orifice in the valve which is to be sealed to provide a fluid-tight seal.

Another feature of this invention is to provide a valve construction of the character mentioned which employs a support assembly and wedge means to position a gate of such valve in front of an orifice to be sealed.

Another feature of this invention is to provide a gate valve construction comprising, a valve body having an inlet and a discharge orifice, a flexible gate for the discharge orifice, and a mechanism for supporting and moving the gate in front of and away from the orifice with the gate being adapted to be sealed against the orifice by upstream fluid pressure defining a dished configuration in the gate which is concave toward the inlet.

Another feature of this invention is to provide a gate valve construction of the character mentioned in which the mechanism for supporting and moving the flexible gate comprises track means and antifriction rollers.

Accordingly, it is an object of this invention to provide a gate valve construction having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show a present preferred embodiment of this invention, in which FIG. 1 is a perspective view illustrating one exemplary embodiment of the valve construction of this invention;

FIG. 2 is an enlarged view with parts in elevation, parts broken away, and parts in cross-section, looking perpendicularly toward the inlet of the valve construction of FIG. 1 minus antifriction rollers and associated tracks;

FIG. 3 is a fragmentary cross-sectional view taken essentially on the line 3—3 of FIG. 2 and illustrating a flexible resilient gate of such valve construction urged in fluid-tight relation against a discharge orifice thereof;

FIG. 4 is a view with parts in elevation, parts broken away, and parts in cross section illustrating the flexible gate minus antifriction rollers and associated tracks in position in front of a discharge orifice of the valve construction without fluid pressure being applied against such gate;

FIG. 5 is a view similar to FIG. 4 illustrating the flexible gate retracted in suspended relation within an upper portion of the valve body and away from the discharge orifice;

DESCRIPTION OF ILLUSTRATED EMBODIMENT

Figure 6:
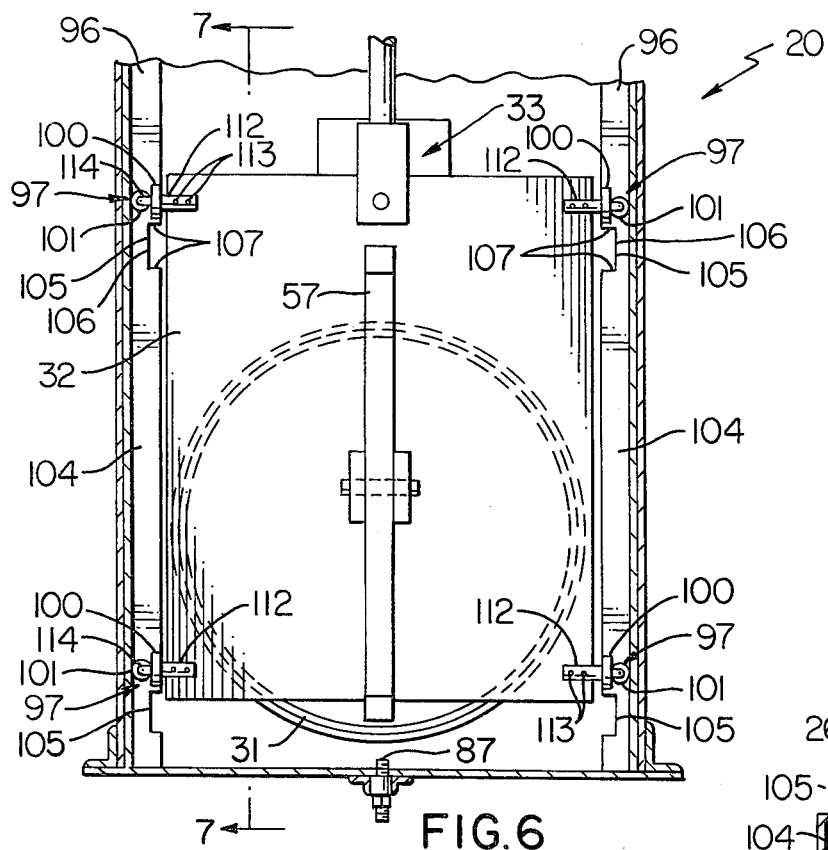
FIG. 6 is a view similar to the lower part of FIG. 2 particularly illustrating antifriction rollers and associated tracks comprising the mechanism for supporting and moving the flexible gate.

Reference is now made to FIG. 1 of the drawings which illustrates one exemplary embodiment of a gate valve construction of this invention which is designated generally by the reference numeral 20. The valve construction 20 is of comparatively large size with such large size being defined as having an effective flow area as defined by a flow passage thereof of circular cross-sectional configuration and having a diameter of several feet which may be as many as 10 or 12 feet, for example.

The valve construction 20 comprises a main housing or valve body 21 which includes a lower portion 23 provided with a tubular member 24 fixed thereto and member 24 has a right circular cylindrical opening therein which defines an inlet 25 for the valve construction 20. The lower portion 23 also has a tubular member 26 suitably fixed thereto and member 26 has a right circular cylindrical opening therein, and has a right circular cylindrical tubular portion 27, of comparatively small axial length, suitably fixed to the upstream portion of member 26, as shown at 30. The portion 27 has an annular, circular entrance edge 31 which will be referred to as the discharge orifice 31 for the valve construction 20.

The valve construction 20 also has a resilient flexible gate 32 which may also be referred to as a yieldable gate 32 and means designated generally by the reference numeral 33 for supporting and moving the gate 32 in front of and away from the orifice 31. FIGS. 2, 3, and 4 of the drawings illustrate the gate 32 disposed in front of the orifice 31 while FIG. 5 illustrates the gate 32 disposed away from such orifice and in particular in suspended relation therebove. For ease of drawing presentation FIGS. 2–5 show the valve construction 20 minus track means and antifriction rollers, of the means, 33 which are shown in FIGS. 6–9 and will be described in detail subsequently.

The gate 32 is adapted to be sealed against the orifice 31 by upstream fluid pressure as indicated schematically by the force arrow 34 in FIG. 3 to define a dished configuration in such gate whereby the gate 32 is concave toward the inlet 25 and thus convex toward the outlet 35 of the valve construction 20.

As indicated earlier the orifice 31 is of circular outline and has a diameter 36 as shown in FIG. 2. The gate 32 is of rectangular outline with both a width and length greater than the diameter 36 of the orifice 31. The gate 32 has a comparatively small thickness 40 generally of the order of a fraction of an inch and is preferably made of a metallic sheet material which is both flexible and highly resilient. For example, the gate 32 may be made of a rectangular sheet of ferrous metal.

The valve body 21 is comprised of a plurality of plate-like structural members including an upstream plate 43 and a downstream plate 44 suitably interconnected by side plates 45 and 46. A base structural assembly 47 is provided and connected to the lower portions of the plates 43-46, and a top plate 48 is connected to the top edges of the plates 43-46. The members 43 through 48 are suitably fixed together as by welding, or the like, to define a substantially fluid tight seal therebetween and such that a fluid (such as a gas) flowing through valve body 21 will not leak therefrom. The tubular members 24 and 26 are also suitably fixed to the plate members 43 and 44 respectively in a fluid-tight manner.

The valve body 21 has an upper portion 50 disposed above members 24 and 26 which is of sufficient vertical height that the gate 32 may be moved in suspended relation within such upper portion, as illustrated at 51 in FIG. 5. The movement of gate 32 within upper portion 50 is such that the lower edge of the gate 32 is disposed clear of the top edge of the orifice 31 and as shown at 52.

The gate 32 has a centrally disposed circular backup disc 53 suitably fixed thereto and such disc has a diameter 59 which is substantially smaller than the diameter of the orifice 31, see FIG. 2. The disc 53 prevents excessive bowing of the central portion of the gate 32 yet the diameter of such disc is sufficiently small that the gate 32 will seal against the orifice 31 in a fluid-tight manner. The disc 53 has a pair of brackets each designated by the same reference numeral 54 suitably fixed thereto in spaced parallel relation and the brackets 54 have a pair of aligned openings 55.

The valve construction 20 has gate positioning means or assembly for initially positioning the gate in front of the orifice 31 and such means is designated generally by the reference numeral 56, FIG. 4. The positioning means 56 comprises a bar structure 57 having a pair of integral projections, each designated by the same reference numeral 60, extending from opposite ends thereof. Each projection 60 has an inclined surface 61 thereon and the purpose of the inclined surfaces 61 will be described subsequently.

The bar 57 has an opening 62 (FIG. 2) extending through its central portion and a pin 63, comprising the positioning means 56, extends through the opening 62 and through the aligned openings 55 in the brackets 54 whereby the pin 63 serves to pivotally attach the bar 57 to the disc 53 and gate 32. Once the disc 53 and gate 32 are disposed within the lower portion 23 of the valve body 21 the gate 32 is free to pivot about the pin 63 and as fluid pressure, indicated by arrow 34, is exerted against the upstream surface of the gate 32 such gate seals tightly against the orifice 31.

The gate positioning means 56 also comprises a pair of horizontally disposed positioning bars shown as a lower bar 64 and an upper bar 65 and such bars are fixed in the lower portion 23 of the valve body 21 on opposite sides of an inner portion 68 of the tubular member 24.

The bars 64 and 65 have inclined surfaces 66 which are adapted to be engaged by inclined surfaces 61 of the projections 60 extending from opposite ends of the bar 57 whereby the surfaces 66 serve as cam surfaces for engaging surfaces 61 and positioning the bar 57 relative to the orifice 31.

The valve construction 20 has means 33 for moving and supporting the gate 32 and such means comprises a stem assembly designated generally by the reference numeral 70. The stem assembly 70 has a bifurcate end 71 provided with a pair of arms 72 having aligned openings 73 extending therethrough. The upper portion of the gate 32 has an opening 74 and a pin 75 extends through the openings 73 and 74 and supports gate 32 in suspended relation within the valve body 21. The stem assembly 70 has a threaded upper portion 76 which is used to move the gate 32 vertically as will now be described.

The valve construction 20 has a roughly U-shaped structure 77 defined by an uppermost horizontally disposed bight 78 adjoined at its opposite ends by a pair of vertical legs 79 having their terminal end edges suitably fixed to plate 48. The valve construction 20 also has an anti-friction bearing assembly 80 suitably supported at the lower portion of the structure 77 and the assembly 80 serves to stabilize the lower portion of the stem assembly 70. The valve construction 20 also has another anti-friction bearing assembly 81 suitably supported on the top surface of the bight 78. The bearing assemblies 80 and 81 allow free anti-friction movement of the threaded upper portion 76 of the stem assembly 70 while allowing movement of the gate 32 vertically upwardly and downwardly into position in front of orifice 31.

The gate construction 20 also has an actuating wheel 84 threadedly received on the threaded upper portion 76 of the stem assembly 70 which operates such that uon rotating the wheel 84 in one direction the gate 32 is lowered into position in front of the orifice 31 and upon rotating the wheel 84 in an opposite direction the gate 32 is moved away from the orifice 31 and as shown in FIG. 5. The wheel 84 may be rotated in either direction manually or by any suitable mechanical means.

The positioning means 56 of the valve construction 20 also comprises an adjustable stop assembly 86 in the form of a threaded stop 87 threadedly received through structure 47 at the base of the valve construction 20. The adjustable stop 86 serves as a lower limit for the bar 57 of the positioning assembly 56 and prevents such bar 57 from moving the gate 32 too far within the housing 21 toward base structure 47. The positioning means 56, including assembly 86, assures that the pin 63 is disposed to coincide with a horizontal diametral line of the orifice 31 whereby one pressure 34 is applies upstream of the gate 32 the peripheral portions of such gate seat firmly against the orifice 31.

The valve construction 20 of this invention with its vertically disposed disc gate 32 may be moved with optimum simplicity due to the simple manner in which such gate is suspended from a single horizontal pin 75. Further, the positioning assembly 56 merely operates to stablize the gate 32 in front of the orifice 31 and once the gate 32 is thus stabilized upstream fluid pressure provides the required seal by bowing the disc 32 against orifice 31 to define an upstream concave configuration.

The gate 32 may be made of any suitable metallic material known in the art and in comparatively lower temperature applications may be provided with a resilient compressible layer or coating on the downstream surface thereof to assure the provision of fluid-tight seal between the gate 32 and orifice 31. Such layer or coating may be in the form of any suitable polymeric material capable of withstanding the temperature environment.

The upper portion of the main body 21 of the valve construction 20 may also be provided with one or more removable plugs 90; and, in this example a plug 90 is provided in each plate 43 and 44. The plugs 90 enable easy access to the interior of the lower portion 23 of the valve body for purposes of cleaning and maintenance.

The valve construction 20 may also be provided with suitable structural reinforcing members for the body 21, as required; and a plurality of such members are indicated at 91, 92, and 93, for example.

As previously indicated, the gate valve construction 20 has a mechanism or means 33 for moving and supporting the gate 32; and, as will be readily apparent from FIGS. 6, 7, 8 and 9, the means 33 includes components which enable the valve construction 20 to be installed in position so that its gate 32 is operated in suspended relation (as shown in the drawings) with the gate moving vertically or so that its gate 32 is operated by substantially horizontal movement thereof and as will be readily understood from the description now to be presented.

The means or mechanism 33 comprises track means shown in this example as a plurality of two vertically disposed tracks each designated by the same general reference numeral 96 and roller means shown as a plurality of four assemblies or sets of antifriction rollers suitably rotatably supported adjacent each corner (FIG. 6) of the rectangular gate 32. Each set of rollers is designated generally by the reference 97 and is defined by two rollers 100 and 101 rotatably supported with their axes of rotation in mutually perpendicular planes. Each roller set 97 operatively associates with an associated track 96 and basically allows smooth antifriction movement of gate 32 toward and away from the position of such gate immediately upstream of valve orifice 31.

Figure 8:
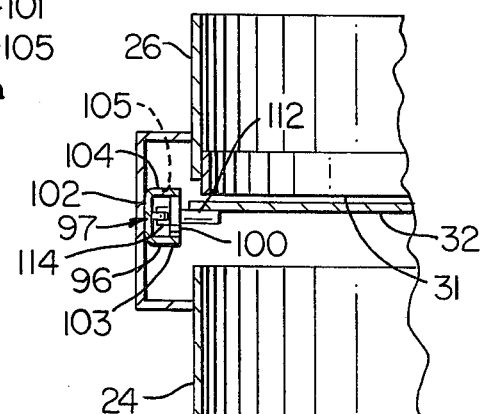
FIG. 8 is a fragmentary view showing upper rollers and a track at one side of the gate valve construction with the flexible gate away from the discharge orifice.
Figure 7:
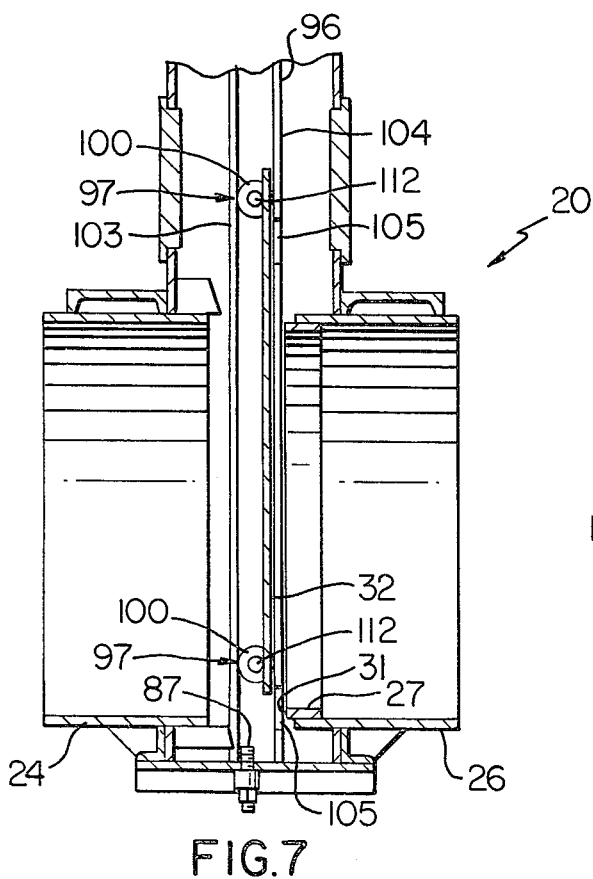
FIG. 7 is a fragmentary cross-sectional view taken essentially on the line 7—7 of FIG. 6.
Figure 9:
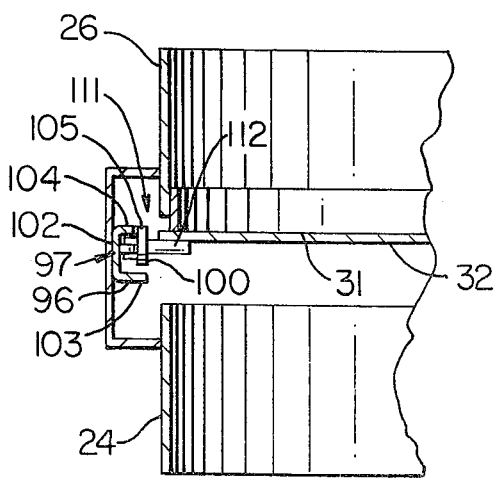
FIG. 9 is a view similar to FIG. 8 with the flexible gate sealed against the discharge orifice.

As best seen in FIGS. 8 and 9, each track 96 has a substantially channel-like or U-shaped cross-sectional configuration defined by a bight 102 and a pair of symmetrically arranged parallel legs 103 and 104 extending from opposite ends of the bight 102. The legs 103 and 104 are substantially identical, with the only difference being that the leg 104 of each U-shaped track 96 has a pair of rectangular cutouts 105 provides in predetermined spaced relation along the track 96. Each cutout 105 is defined by U-shaped notched surface edges in the leg 104 comprised of a bottom edge 106 and a pair of transverse edges 107 extending from opposite ends of the bottom edge 106.

Each notch 105 cooperates with an associated roller set 97 such that once the gate 32 is moved into position in front of orifice 31 with the lower end edge of the bar 57 engaging the threaded stop 87, each roller set 97 is aligned so that its comparatively larger roller 100 is essentially disposed between edges 107 of an associated notch 105. With the gate 32 in this position once upstream pressure is applied as illustrated by the force arrow 34 in FIG. 3, the comparatively larger roller 100 moves within the notch 105 as illustrated at 111 in FIG. 9 and allows the gate 32 to seal against the orifice 31.

As best seen in FIG. 6 each roller set 97 is suitably supported by a support shaft 112 which is fixed by rivets or threaded bolts 113 adjacent an associated corner of the gate 32. The shaft 112 may have suitable threaded openings therein which receive threaded bolts 113 which extend through cooperating openings in the gate 32.

The shaft 112 rotatably supports the comparatively large roller 100 adjacent its inner end portion and the shaft 112 has a terminal bifurcate end portion 114 which rotatably supports the comparatively smaller roller 101 therewithin. The bifurcate end portion 114 may be defined on shaft 112 as a portion of a single-piece construction or portion 114 may be a separate member suitably detachably fixed to the main portion of the support shaft structure 112.

The comparatively large roller 100 of each roller set 97 is supported for antifriction rotation and has suitable retaining means, which may comprise a portion of an antifriction bearing therefor, which prevents movement of the roller 100 axially along the shaft 112. The roller 101 may also be supported for antifriction rotation within the bifurcate end 114 by suitable antifriction bearing means, or the like.

Thus, it will be seen that the comparatively small antifriction rollers 101 engage the bights 102 of the U-shaped tracks 96 and enable movement of the gate 32 vertically without substantial movement thereof transverse the longitudinal fluid flow axis of the valve construction 20. Similarly, it will be seen that the comparatively large rollers 100 engage the legs 103 and 104 of the U-shaped tracks 96 and enable vertical movement of the gate 32 without substantial movement thereof parallel to the flow axis of the valve construction.

From the above description, it will be appreciated that the shown two U-shaped or channel-like tracks 96 and the four roller sets 97 enable the gate valve construction 20 to be installed and operated so that its gate 32 may be moved vertically, as shown, or so that its gate 32 may be moved horizontally.

The gate 32 is moved in position directly in front of orifice 31 and in such position the member 57 engages the threaded stop 87. With gate 32 thus positioned each roller set is disposed opposite and in alignment with an associated notch 105 and each larger roller 100 of each set 97 is centered within such notch whereby upsteam fluid pressure urges flexible gate 32 against the orifice 31 in the manner previously described with each roller 100 moving partially within its notch.

However, once it is desired to open the gate 32 the comparatively large rollers 100 serve as cam rollers with each roller 100 engaging an upper surface edge 107 of its associated notch 105 and serving to cam or move its entire roller assembly or set 97 so that it is in a centered position within its associated U-shaped track 96. During this cam roller action of a roller 100 the comparatively small roller 101 associated therewith merely slides along its associated bight 102.

It will also be appreciated that the various component portions of the valve construction 20 may be made of any suitable material employed in the art, with the material being compatible with the fluid flowing through the valve construction 20 and with the material also being capable of withstanding the required ambient temperature as well as the temperature and pressure of the fluid flowing through the valve construction 20.

In this disclosure of the invention the tubular members 24 and 26 are shown without flanges for fastening same in a fluid conduit system and it is to be understood that such members may be suitably fastened by welding or the like. In addition, it may be desired in some applications to provide annular flanges at the terminal outer ends of the members 24 and 26 for fastening with cooperating flanges of an associated conduit system.

While present exemplary embodiments of this invention and methods of practicing the same, have been illustrated and described, it will be recognized that this invention may be otherwise variously embodied and practiced within the scope of the following claims.

What is claimed is:

1. A gate valve construction comprising; a valve body having an inlet and a circular discharge orifice; a flat flexible gate for said discharge orifice; means for supporting and moving said gate in front of and away from said orifice; said gate being adapted to be sealed against said orifice by upstream fluid pressure to define a dished configuration therein which is concave toward said inlet; a rigid back-up disc fixed against the central portion of said gate; said disc having a peripheral outline which is substantially less than the diameter of said orifice thereby enabling the outer portion of said flexible gate to define said dished configuration; and positioning means for said gate comprising, a bar having a central portion and a pair of projections extending in parallel relation from opposite ends thereof, means pivotally attaching said central portion to said backup disc, said means pivotally attaching including a pivot pin, said projections being disposed radially outwardly of said orifice with said gate disposed upstream of said orifice, each of said projections having a positioning surface thereon, and a pair of positioning members fixed in said valve body at diametrically opposed positions thereof and also radially outwardly of said orifice, each of said members having an inclined surface which is adapted to be engaged by an associated positioning surface, said inclined surfaces serving as cam surfaces which engage said positioning surfaces and position said bar and gate in front of said orifice while allowing free pivoting movement of said bar and gate about said pivot pin and also allowing unobstructed forming of said dished configuration.

2. A valve construction as set forth in claim 1 in which said orifice is of circular outline and said gate is of rectangular outline having a width and a length each of which is greater than the diameter of said orifice.

3. A valve construction as set forth in claim 2 in which said gate is in the form of a flat metal sheet.

4. A valve construction as set forth in claim 1 in which said means for supporting and moving said gate comprises a stem assembly having a pin attached to a lower end thereof, said pin being adapted to be received in an opening in said gate to attach said gate thereto.

5. A valve construction as set forth in claim 4 in which said stem and gate are substantially vertically disposed and said stem assembly has a bifurcate end with legs disposed on opposite sides of said gate, said pin extending through said opening in said gate and openings in said legs aligned therewith.

6. A valve construction as set forth in claim 1 in which said positioning means further comprises an adjustable stop on said valve body for limiting the movement of said gate vertically downwardly.

7. A valve construction as set forth in claim 6 in which said gate is generally of the order of several feet in diameter and said orifice is defined by an edge of right circular cylindrical tubular body.

8. A gate valve construction comprising; a valve body having an inlet and circular discharge orifice generally of the order of several feet in diameter; a flexible gate for said discharge orifice; means for supporting and moving said gate in suspended relation in front of and away from said orifice; said gate being adapted to be sealed against said orifice by upstream fluid pressure to define a dished configuration therein which is concave toward said inlet; said gate being of rectangular outline having a width and a length each of which is greater than the diameter of said orifice; said gate being in the form of a flat metal sheet having a comparatively small thickness generally of the order of a fraction of an inch; a centrally disposed circular back-up disc fixed against the central portion of said gate; said disc having a diameter which is substantially less than the diameter of said orifice thereby enabling the outer portion of said flexible gate to define said dished configuration; and positioning means for said gate comprising, a bar having a central portion and a pair of projections extending in parallel relation from opposite ends thereof, means pivotally attaching said central portion to said back-up disc, said means pivotally attaching including a pivot pin, said projections being disposed radially outwardly of said orifice with said gate disposed upstream of said orifice, each of said projections having a positioning surface thereon, and a pair of positioning members fixed in said valve body at diametrically opposed positions thereof and also radially outwardly of said orifice, each of said members having an inclined surface which is adapted to be engaged by an associated positioning surface, said inclined surfaces serving as cam surfaces which engage said positioning surfaces and position said bar and gate in front of said orifice while allowing free pivoting movement of said bar and gate about said pivot pin and also allowing unobstructed forming of said dished configuration.

9. A valve construction as set forth in claim 8 in which said means for supporting and moving said gate comprises a stem assembly having a pin attached to a lower end thereof, said pin being adapted to be received in an opening in said gate to attach said gate thereto.

10. A valve construction as set forth in claim 9 and further comprising a removable access panel in said valve body providing access to the interior thereof for cleaning and maintenance purposes.

11. A valve construction as set forth in claim 8 in which said positioning means further comprises an adjustable stop on said valve body for limiting the movement of said suspended gate vertically downwardly.

12. A gate valve construction comprising, a valve body having an inlet and a discharge orifice, a flexible gate of flat sheet material for said discharge orifice, and means for supporting and moving said gate in front of and away from said orifice, said gate being adapted to be sealed against said orifice by upstream fluid pressure to define a dished configuration therein which is concave toward said inlet, said supporting and moving means comprising track means together with cooperating antifriction rollers and a plurality of support shafts fixed to said gate and supporting said rollers on said gate, said orifice being of circular outline and said gate being of rectangular outline having a width and a length each of which is greater than the diameter of said orifice, said track means comprising a pair of spaced tracks of U-shaped cross section and said rollers comprise a plurality of sets of antifriction rollers corresponding in number to said plurality of said support shafts, each set of rollers being rotatably supported on its support shaft and each set of rollers comprising a pair of rollers disposed within an associated track with their axes of rotation in mutually perpendicular planes.

13. A valve construction as set forth in claim 12 in which said flat sheet material of said gate is in the form of a flat metal sheet.

14. A valve construction as set forth in claim 12 in which each of said set of rollers comprises a pair of rollers wherein one roller of said pair engages an associated track and restrains said gate against movement perpendicular to the longitudinal flow axis of said valve construction and another roller of said pair engages the associated track and restrains said gate against movement parallel to said longitudinal axis.

15. A valve construction as set forth in claim 12 in which said plurality of support shafts comprise a plurality of four support shafts each fixed to said rectangular gate adjacent a corner thereof and said plurality of sets of antifriction rollers comprise a corresponding four sets of antifriction rollers, said pair of spaced tracks and said plurality of four sets of antifriction rollers being adapted to move said gate in spaced relation upstream of said orifice, each of said pair of spaced tracks having a pair of spaced notches therein wherein each notch is adapted to receive a cam roller of an associated set of rollers therewithin and once fluid pressure is applied against said gate said notches allow movement of said gate from its position upstream of said orifice thereagainst to define said dished configuration therein.

16. A valve construction as set forth in claim 15 in which each of said pair of spaced notches has a pair of spaced edges defining opposed sides thereof, each of said cam rollers of an associated set of rollers received within a notch being brought into engagement with an associated edge of a notch during opening of said gate and serving to cam its set of rollers to a centered position within its track.

* * * * *

UNITED STATES PATENT OFFICE
CERTIFICATE OF CORRECTION

Patent No. 4,131,131　　　　　　　　　Dated December 26, 1978

Inventor(s) Paul P. Frisch

It is certified that error appears in the above-identified patent and that said Letters Patent are hereby corrected as shown below:

Column 4, line 54, "one" should be -- once --.

Column 4, line 54, "applies" should be -- applied --.

Column 5, line 49, "provides" should be -- provided --.

Signed and Sealed this

Fifth Day of June 1979

[SEAL]

Attest:

RUTH C. MASON
*Attesting Officer*

DONALD W. BANNER
*Commissioner of Patents and Trademarks*